March 3, 1964  G. F. BOLTZ ETAL  3,123,456
AIR PRE-CLEANING APPARATUS
Filed May 11, 1960  3 Sheets-Sheet 1
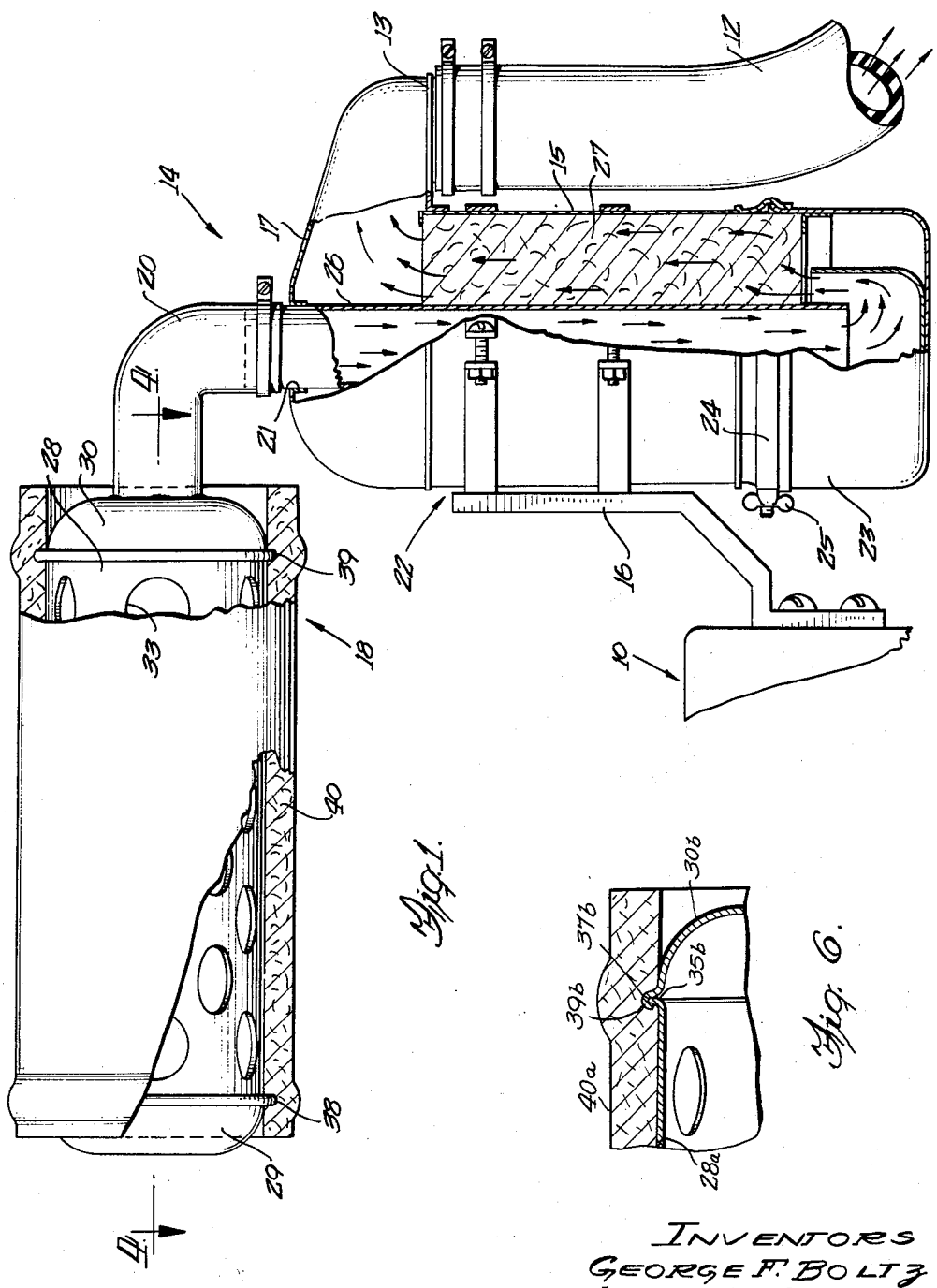
INVENTORS
GEORGE F. BOLTZ
JAMES H. BORNZIN
Paul O. Pippel
ATTORNEY

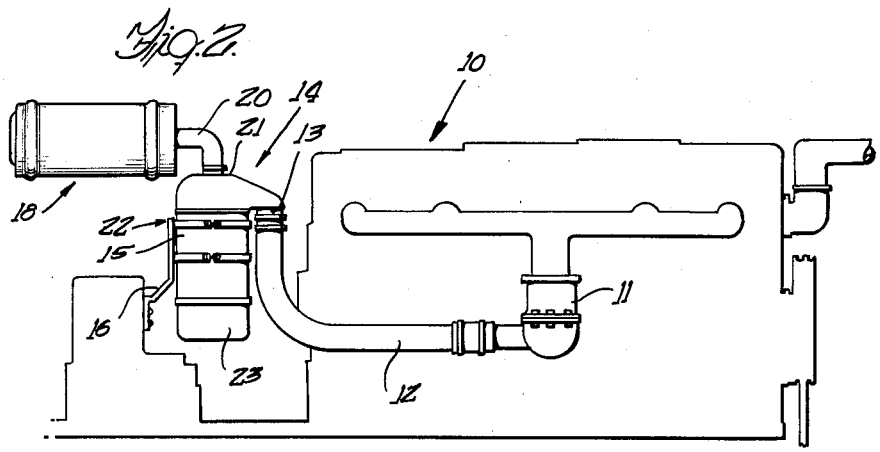
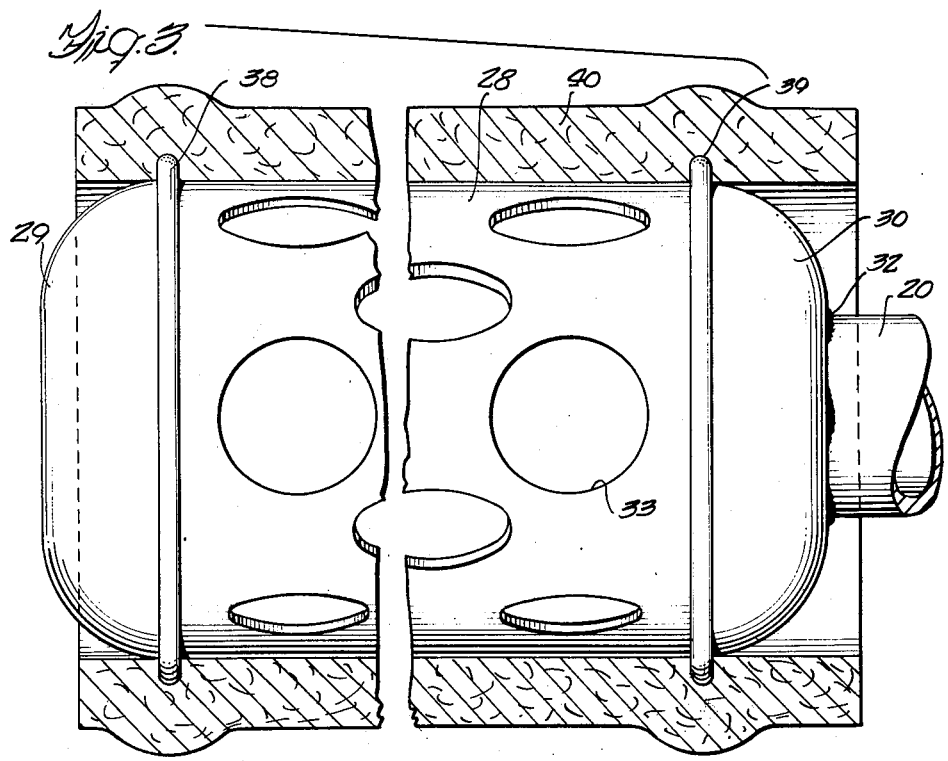

INVENTORS
GEORGE F. BOLTZ
JAMES H. BORNZIN

ATTORNEY

United States Patent Office 3,123,456
Patented Mar. 3, 1964

3,123,456
AIR PRE-CLEANING APPARATUS
George F. Boltz, Downers Grove, and James H. Bornzin, La Grange, Ill., assignors to International Harvester Company, Chicago, Ill., a corporation of New Jersey
Filed May 11, 1960, Ser. No. 28,381
3 Claims. (Cl. 55—492)

This invention relates to air cleaning apparatus for cleaning and filtering dirt and other objectionable abrasive matters from the air supplied to the induction system of an internal combustion engine. More particularly, however, it is directed to a means for selectively pre-cleaning or filtering the quantities of air supplied for operation of such engines.

Although many types and varieties of air filtering and cleaning devices have, heretofore, been developed, and presently are available for purchase on commercial markets, it has been found that none of these devices are entirely suitable for certain types of air filtering and cleaning operations. Reference is made particularly to the field operation of certain types of equipment such as cotton picking machines where considerable difficulty continues to be encountered in attempting to filter out such objectionable extraneous matter as cotton lint, or in the harvesting of soy beans wherein the fuzz therefrom presents a similar difficulty, and where in such operations these extraneous matters are combined or intermingled with dust particles. The removal of such objectionable foreign matter is, of course, recognized as a most desirable prerequisite in order to prevent such matter from entering into the air induction system of the internal combustion engines ordinarily employed for driving or motivating the machines and, heretofore, many efforts have been directed in such direction without material success. While filtering devices utilizing combinations of pre-cleaners, with subsequent downstream oil bath cleaners, as well as with other conventional forms of filtering means of well-known types of filtering apparatus, are presently frequently employed, the combined effectiveness of such devices is not highly satisfactory because, the length of the period of operation thereof, before plugging of the filter element occurs, is too limited, and as a result thereof recleaning occurrences are much too frequent to permit efficient operation of the machines associated therewith. Furthermore, the cleaning of accumulations of cotton lint and soy bean fuzz from the oil bath or other filter elements is a most difficult task which, at best, is never completely satisfactory.

It has been found by the inventors hereof that by modifying the filtering element in the pre-cleaning portion or component of a filtering apparatus of the type that uses a pre-cleaner in series with a subsequent or primary downstream filtering means such as an oil bath or other suitable filtering component, undesirable foreign matter, such as cotton lint, soy bean fuzz and like fibrous matters may be selectively filtered by the pre-cleaner out of the air stream along with a limited portion of dust or dirt particles so that any remaining dust or dirt particles may thereafter be readily removed by said subsequent primary filtering means. In this manner the primary filter is called upon only to filter out the dust and dirt particles for which it is particularly adapted, since the objectionable fibrous matters are removed prior thereto. It was found that by using a pervious, cellular or spongy material that was very soft and resilient in texture and having minute random arranged openings therethrough for initially pre-cleaning or filtering the air the undesirable cotton lint, soy bean and like particles could be removed from the air stream before said stream reached the subsequent primary filtering means where the remaining dirt particles could then be effectively and easily removed.

It was also found that such a filtering element could be readily applied to certain forms of commercially available filtering devices, with very limited modification required in the structure thereof in order to adapt such structures for accommodating the newly proposed filtering element. Furthermore, it was found that by using such an element the unit lends itself to simple and easy cleaning so that the efficiency thereof as a filtering device is maintained at a high standard of excellence.

It is an important feature of the present invention, therefore, to provide an improved and novel air pre-cleaning device for removing, selectively, extraneous matters from air that is initially directed therethrough for cleaning purposes.

Another important object is to provide an air pre-cleaning device that utilizes a peripherally non-interrupted blanket of foraminous cellular material with a soft and resilient texture, supported on a perforated frame or tubular body member, for filtering out of air passed through said pre-cleaner objectionable extraneous fibrous materials such as cotton lint and soy bean fuzz, and wherein the blanket is arranged for easy removal from the perforated frame or tubular body to facilitate cleaning of the blanket.

A primary object of the invention is to provide, for use in conjunction with internal combustion engines, an improved air filtering apparatus of the type which includes a pre-cleaner for removing certain types of the larger dimensioned and fibrous foreign matters from any air directed therethrough, in combination with an additional filtering means positioned downstream in series therewith for removing other smaller dimensioned foreign dirt particles from the air subsequent to its passage through the pre-cleaner.

Another prime objective is to provide an improved air pre-cleaner fashioned in the form of a perforated elongated cylinder with a resilient sleeve-like external covering of close-fitting, spongy filtering material stretched over the perforated area thereof and which is retained fixed in such position by virtue of the elasticity of said filtering material.

A further object is to provide an air or gas pre-cleaner wherein a filtering element, fashioned as a peripherally continuous sleeve-like blanket from a soft foraminous resilient textured material of the polyurethane foam type which has a three dimensional skeletal stranded structure that is completely permeable, is dimensioned to removably but snugly fit over an elongated perforated hollow member having one end thereof communicating with a device containing an additional air filtering means for further filtering the air or gas directed thereinto and wherein all the air or gas directed through said additional filtering means must pass initially through said blanket of resiliently textured foam filtering material.

The foregoing and other objects and features of the invention will become apparent as the disclosure is more fully made in the following detailed description of a preferred embodiment of the invention as illustrated in the accompanying sheets of drawings in which:

FIG. 1 is a side elevational view of an air filtering apparatus in which the present invention is embodied, portions thereof being shown cut-away to illustrate the structural details thereof.

FIG. 2 shows the device illustrated in FIG. 1 as employed in conjunction with an internal combustion engine.

FIG. 3 is a side elevational view, partially broken away to better illustrate details of structure of the pre-cleaner portion of the assembly shown in FIG. 1, but shown in generally enlarged dimensions with respect thereto.

FIGURE 6 is a fragmentary longitudinal sectional view showing a modified form of the filtering element illustrated in FIGURE 5.

Figure 4:
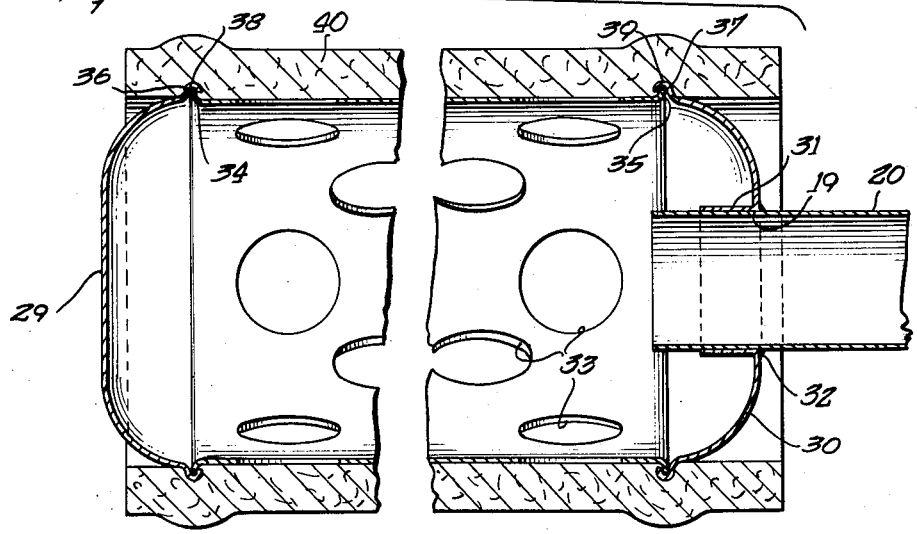
FIG. 4 is a longitudinal section of the proposed pre-cleaner and is taken generally along the line 4—4 of FIG. 1, but shown in somewhat enlarged dimensions with respect thereto.

Referring now to the drawings, where there are depicted two preferred embodiments of the present invention, it will be noted that the invention has been illustrated as employed in association with an internal combustion engine represented generally by the reference numeral 10. A carburetor of the conventional up-draft type is shown at 11 mounted on the engine although it will be appreciated the invention is not limited to this specific type of carburetor device. An inlet opening in said carburetor receives one end of a conduit or pipe 12 the opposite end of which is removably connected to the outlet 13 of a filtering apparatus assembly indicated generally by the numeral 14. Said assembly may include a main or primary filtering unit which is contained within a housing or casing, such as 15 that is supportably carried on the engine 10 by a suitable clamp-like bracket support 16, an upper manifold or air directing chamber 17 affixed to said casing, and a pre-cleaner filtering unit 18 the outlet 19 of which is connected by a pipe or conduit 20 to an inlet 21 of the manifold portion thereof.

The main or primary filtering unit may be any conventional or well known device adaptable for filtering the air supplied to internal combustion engines without limiting or confining the invention to use with any specific such filtering device. In the illustration selected for showing one preferred application of the proposed invention the primary filtering unit, indicated generally by the numeral 22, is of the oil-bath type manufactured and marketed commercially by the Donaldson Air Cleaner Company, although it will be readily appreciated that the invention is equally susceptible to application with many other types and forms of primary filtering units.

The primary unit 22, as illustrated, comprises the generally circular and elongated open-ended casing 15, the lower open-end of which cooperatively mates with an open-end of an oil cup 23 and is suitably removably secured thereto by a clamping strap 24 and wing nut 25. The upper open-end of the casing 15 is affixed to and communicates with manifold 17 the inlet 21 of which includes a connecting pass-through pipe 26 that extends centrally downward through said casing and projects into the oil cup 23. The hollow interior of the casing 15 is filled with conventional filtering screens 27 which function to remove the dust in the air entrained with the oil as a result of its passing through the oil bath upon entering the unit. The oil picked up with the air as it passes through the oil bath deposits out and is collected on the screens and eventually drains back into the oil cup as is well understood. The air upon reaching the manifold chamber 17 is then clean and free of oil whereupon it is directed through the outlet 13 to the carburetor 11 of the engine.

The inlet pipe 26 of the primary filter unit 22 is arranged to telescopically receive the connecting pipe 20 which fits snugly over the projecting end thereof. This connecting conduit 20 may take the form of an elbow conduit and the opposite end thereof is connected into and communicates with the pre-cleaner unit 18. Such pre-cleaner, as illustrated in one preferred embodiment depicted herein, includes a frame or tubular body member fashioned as an elongated cylinder, indicated generally by the reference numeral 28, having the outer end thereof closed by the cover or end plate 29, while the opposite or inner end of the cylinder is closed with an end plate 30 having an inwardly turned flange 31 extending from the outlet opening 19 therein that is dimensioned to receive one end of the elbow pipe 20. Any suitable or well known means, such as the welds indicated at 32, may be used for securely fixing said elbow in place in said end plate opening. The cylinder frame 28 has the longitudinal surface thereof perforated by a plurality of apertures or openings, such as 33, that extend over a substantial portion of the entire surface thereof. The end edges of the perforated cylinder 28 may be outwardly turned or flanged as shown at 34 and 35, while the cooperating end edges of the end plates 29 and 30 are inwardly flanged or turned, as indicated at 36 and 37, so as to overlap the cylinder ends. Hence, when these overlapping flanged portions are tightly clamped as by crimping or the like thereon the end plates become securely fixed to the cylinder in an air-tight relationship and peripheral beads 38 and 39 are formed to project radially outwardly beyond the peripheral surface of the cylinder. This, in effect, provides a flat and shallow annular recess that extends longitudinally between said end cover plates.

In accordance with the more specific teachings of the invention there is provided a sleeve-like blanket or covering, such as 40, which is tightly fitted externally over the perforated portion of the frame-like cylinder 28 between the end plates thereof, which serves as an air and gas filtering element therefor. The sleeve is formed from a sponge-like foraminous material that is very soft and resilient in texture, and the cellular structure thereof is of such nature that it causes, in effect, the creation of minute random arranged openings that result in providing small dimensioned staggered interstices or passages from one surface to the other thereof. The small intertwined passages thus serve to restrict the passage of certain types of dirt particles intermingled with air without appreciably restricting the passage of air therethrough. This material was found to be particularly adaptable for restricting the passage therethrough of fibrous foreign matters, such as cotton lint and soy bean fuzz, plus a limited amount of dust particles, while permitting the remainder of the dust and dirt particles to pass through for more complete filtering out by a subsequent primary filtering element particularly adaptable for filtering out such types of dirt particles. With the proposed filtering element fashioned in the form of an external sleeve removably positioned over the perforated cylinder frame 28, it will be appreciated that such sleeve may readily and easily be removed for cleaning merely by grasping the overlying or overextending ends thereof and sliding it axially off the frame after which the cleaning thereof may be accomplished by shaking, squeezing or beating the sleeve against a hard surface, or, if desired, may be washed with water containing a small quantity of a suitable detergent.

Since the proposed filtering element is fashioned of a spongy resilient material it will be recognized that it may be stretched for positioning over the perforated frame after which the natural resiliency of the material will function to contract the dimensions thereof, in the fashion of a hoop in tension, sufficiently to securely fix the sleeve element in position circumscribing the perforated frame. In view of this characteristic of the filtering element it will be understood that no additional holding or securing means will be required for retaining the sleeve-like element in position once it has been placed around the outside of the perforated cylinder frame 28.

It will be noted that the beaded outer edges 38 and 39 of the respective end plates 29 and 30 are slightly larger in radial dimension than that of the perforated portion of the frame member positioned therebetween. This arrangement serves to provide an improved sealing means between the filtering material and the supporting tubular-like frame and thereby aids in preventing unfiltered air from getting through the perforated portion and into the interior of the frame without first having had to pass through the filtering material enveloping the frame.

The proposed filtering material is a polyurethane foam of the flexible type which has a three dimensional skeletal stranded structure that is completely permeable. Although it is not known at this time whether or not all polyurethane types of foam materials would meet these requirements and accomplish the objectives of the present invention it is known that the flexible polyurethane foam manufactured and marketed commercially by the Scott Paper Company of Chester, Pa., under the trade name of "Scottfoam" is highly satisfactory for the purpose. This particular polyurethane foam when used in a blanket approximately ½" thick and with a porosity rated as 45 pores per inch was found to do a highly creditable job of selectively removing objectionable fibrous matters from air directed therethrough when employed in a precleaner unit. Furthermore, the resiliency of this foam readily permitted its use in a stretched fashion as contemplated so as to eliminate the need of additional securing or fastening means on its mounting frame.

Figure 5:
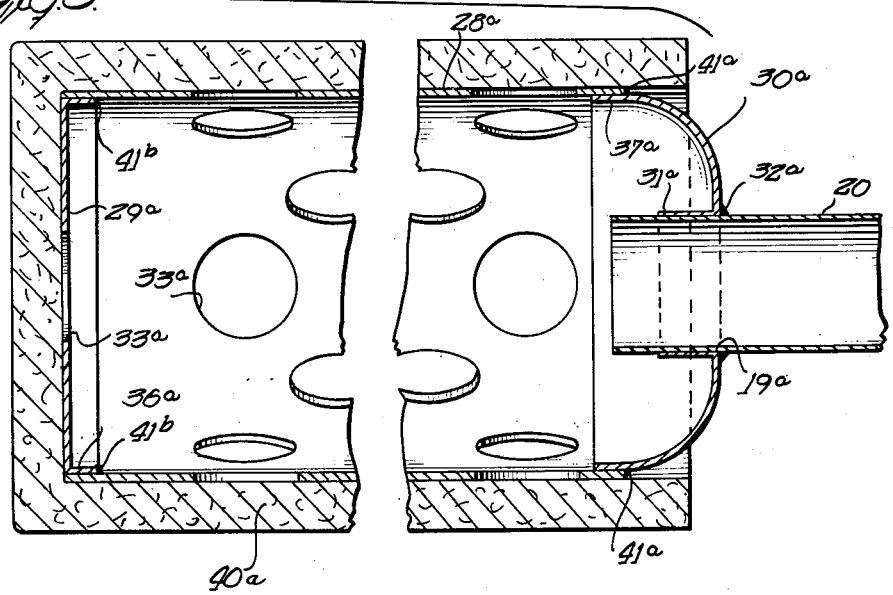
FIG. 5 is a longitudinal sectional view similar to FIG. 4 but showing a modified form of the filtering element and the tubular frame or body member of the pre-cleaner according to the invention.

In FIG. 5 there is shown a modified form of the proposed pre-cleaner filtering unit which also incorporates the teachings of the invention. In this modification the preforated frame member 28a is fashioned with the ends thereof straight and unflanged and the inner end thereof receives the inwardly flanged edge 37a of the end plate 30a and may be securely affixed thereto by any suitable or well known means such as the welds indicated at 41a. The opposite or outer end also varies somewhat from the preceding form in that the end plate 29a is provided with perforations or apertures, such as is the frame member 28a, and is fashioned with an inwardly turned or flanged end edge 36a dimensioned to be fitted into the frame member 28a whereupon suitable securing means such as the welds indicated at 41b may then be used for fixedly securing said end plate in position.

In FIGURE 6 there is shown a modified form of the proposed pre-cleaner filtering unit illustrated in FIG. 5. In this modification the perforated frame member 28a is outwardly turned or flanged as shown at 35b while the cooperating edge of the end plate 30b is inwardly turned or flanged as shown at 37b. When these turned or flanged portions are overlapped and tightly clamped, as by crimping or the like, the end plate 30b becomes securely fixed to the frame member 28a.

The filtering element 40a in the modifications shown in FIGURES 5 and 6 may be fashioned to resemble a cup or pail-like receptacle with one end thereof open and which may then be easily positioned over the perforated frame 28a by sliding it in stretched fashion axially thereover. As before, the natural resiliency of the material is taken advantage of to provide a tight or snug fitting element whereby the filtering element is retained in position by virtue of the contractible faculty thereof, and which faculty additionally provides good sealing means to prevent any unfiltered air leaking past the elements and getting into the interior thereof without first having been filtered by passing through the filtering material 40a.

Although in the embodiments illustrated herein the frame member is depicted as a tubular or cylindrical element it will be readily appreciated that the invention is not limited to this specific configuration, since it is felt that an element having some other cross-sectional shape, such, for instance, as a square, or rectangle, or a polygon, would accomplish the teachings of the invention with equal facility.

Although only a limited number of preferred forms of the invention have been illustrated and described in detail, it will be apparent to those skilled in the art that various other modifications may be made therein without departing from the spirit of the invention or from the scope of the appended claims.

What is claimed is:

1. In an air pre-cleaner the combination of a skeletal support comprising an elongated hollow body with a plurality of apertures therethrough, an end wall closing each end of the body and having an annular beaded edge portion projecting radially outwardly of the body, an outlet means extending through one of said end walls and communicating with the interior of the body, and an elongated hollow filter element made of a bed of polyurethane foam material of the type providing a three dimensional skeletal stranded structure that is completely permeable sleeved over said body and said beaded edge portions and having a length extending beyond the said beaded edge portions and disposed in snug embracing relationship to said body and beaded edge portions, said material being resilient and solely secured to said body and beaded edge portions by hoop tension and adapted to be removed from the body by being grasped at an end edge thereof beyond the respective beaded portion and forced axially off said body and having said beaded edge portions formed at the juncture of said body and each end portion and extending beyond the outer peripheral surface of the body sufficiently to provide in cooperation with said sleeve an air seal at each end thereof for preventing unfiltered air from passing through said apertures and into the interior of said body without first passing through said filtering material.

2. In an air pre-cleaner the combination of a skeletal support comprising a hollow cylindrical body with a plurality of apertures therethrough, an end wall closing each end of the body and having an annular beaded edge portion projecting radially outwardly of the body, an outlet means extending through one of said end walls and communicating with the interior of the body, and a hollow cylindrical filter element made of polyurethane foam material of the type providing minute random arranged openings therethrough sleeved over said body and said beaded edge portions and having a length extending beyond the said edge portions and disposed in snug embracing relationship thereto, said material being resilient and solely secured to said body and beaded edge portions by hoop tension and adapted to be removed from the body for cleaning by being grasped at an edge thereof beyond the respective beaded portion and moved axially off the body and having said beaded edge portions formed at the juncture of said body and each end portion and extending beyond the outer peripheral surface of the body sufficiently to provide in cooperation with said sleeve an air seal at each end thereof for preventing unfiltered air from passing through said apertures and into the interior of said body without first passing through said filtering material.

3. In an air pre-cleaner the combination of a skeletal support comprising an elongated cup-like body having one end thereof open and having a plurality of apertures therethrough, an end wall closing the open end of said body and having an annular beaded edge portion projecting radially outwardly of the body, an outlet means extending through said end wall and communicating with the interior of the body, and an elongated cup-like filter element made of polyurethane foam material of the type providing a three dimensional skeletal stranded structure that is completely permeable positioned over the apertured portion of said body and beaded edge portion and having a length extending beyond the said beaded edge portion and disposed in snug embracing relationship to said body and beaded edge portion, said material being resilient and solely secured to said body and beaded edge portion by hoop tension of the material and adapted to be removed therefrom by forcing the element axially off said body and having said beaded edge portion formed at the juncture of said body and said end wall and extending beyond the outer peripheral surface of the body sufficiently to provide in cooperation with said filter element an air seal for preventing air and extraneous foreign matter entrained therein from entering through said apertures and into the interior of said body without first passing through said filtering material.

References Cited in the file of this patent

UNITED STATES PATENTS

| | | |
|---|---|---|
| 956,862 | Meyer | May 3, 1910 |
| 1,067,759 | Robertson | July 15, 1913 |
| 1,209,911 | Wagner | Dec. 26, 1916 |
| 2,770,241 | Winkler | Nov. 13, 1956 |
| 2,926,389 | Garlington | Mar. 1, 1960 |
| 2,966,960 | Rochlin | Jan. 3, 1961 |

FOREIGN PATENTS

| | | |
|---|---|---|
| 471,560 | Great Britain | Sept. 7, 1937 |
| 564,921 | Great Britain | Oct. 18, 1944 |